United States Patent [19]

Mayer

[11] 4,357,651
[45] Nov. 2, 1982

[54] RECTANGULAR SEAL BEAM LAMP AND UNIVERSAL SUPPORT ASSEMBLY

[75] Inventor: William R. Mayer, Rochester, Ill.

[73] Assignee: Stewart-Warner Corporation, Chicago, Ill.

[21] Appl. No.: 220,248

[22] Filed: Dec. 23, 1980

[51] Int. Cl.³ .............................................. F21V 21/29
[52] U.S. Cl. .................................... 362/275; 362/287; 362/369; 362/421; 362/427; 362/429
[58] Field of Search ............... 362/287, 421, 429, 431, 362/275, 369, 427

[56] References Cited

U.S. PATENT DOCUMENTS

| | | | |
|---|---|---|---|
| 1,560,458 | 11/1925 | Wise | 362/421 X |
| 2,614,437 | 10/1952 | Meggitt | 362/421 X |
| 2,854,892 | 10/1958 | Stark | 362/421 X |
| 3,278,203 | 10/1966 | Snyder | 362/421 X |
| 3,501,627 | 3/1970 | Macemon | 362/421 X |
| 4,103,323 | 7/1978 | Urbanek | 362/306 |

*Primary Examiner*—Peter A. Nelson

[57] ABSTRACT

A rectangular seal beam lamp and single-point universal support assembly for vehicles that is replaceable as a unit and that has high shock-absorbing characteristics. The lamp includes a rectangular plastic paraboloidal reflector having an integral single polygonal support post that carries a slotted rubber ball member which forms part of the mount for the lamp. The ball is compressed and clamped against the post by a pair of mating semi-spherical cooperating fastener elements that support the lamp unit and permit adjustment of the lamp beam in any direction by a single adjustment.

11 Claims, 12 Drawing Figures

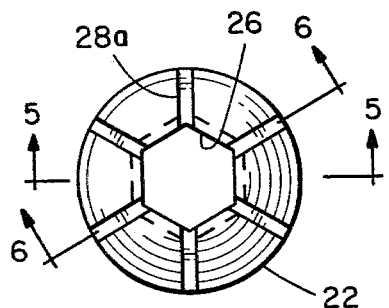
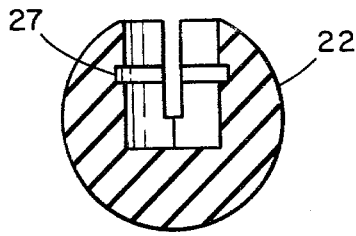
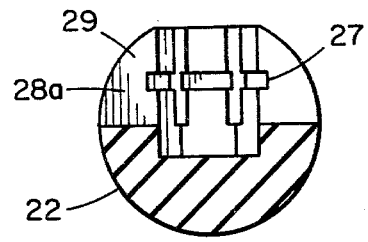
FIG.4　　　　FIG.5　　　　FIG.6
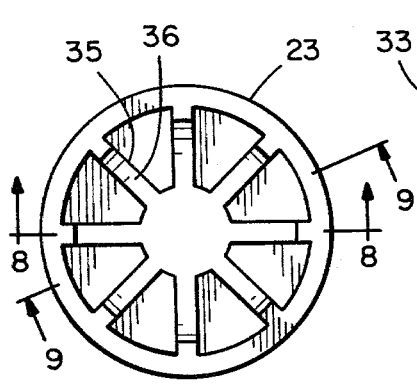
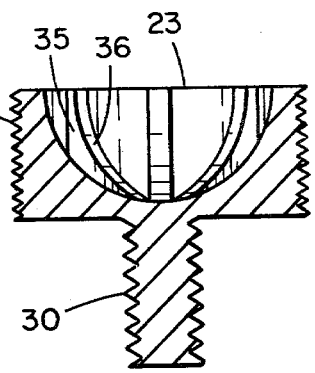
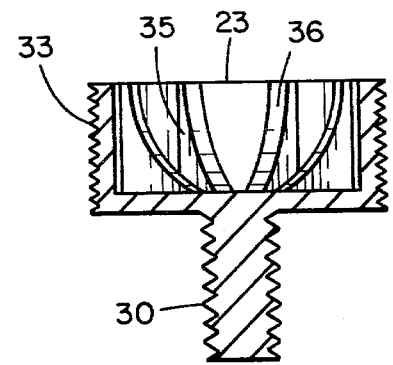
FIG.7　　　　FIG.8　　　　FIG.9
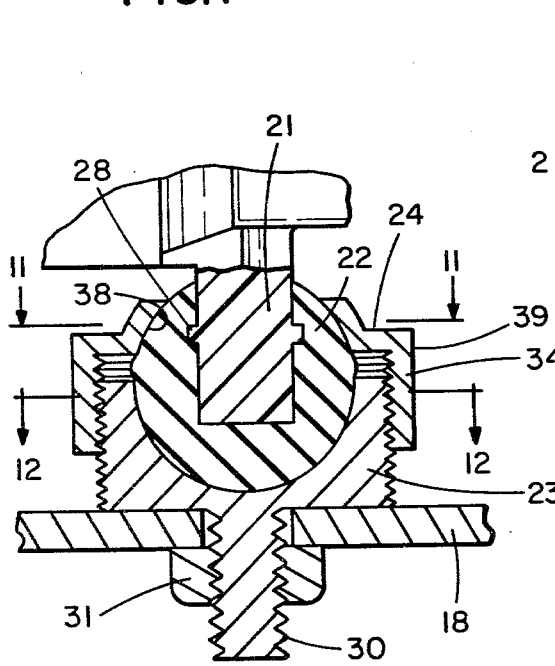
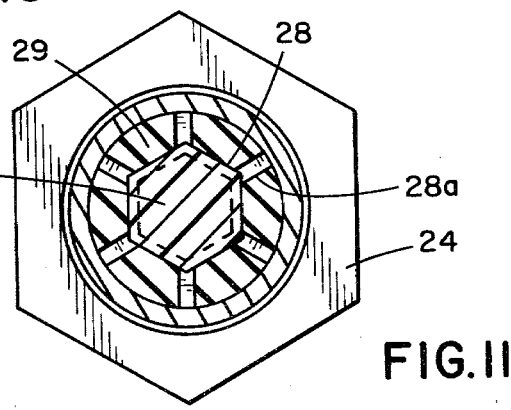
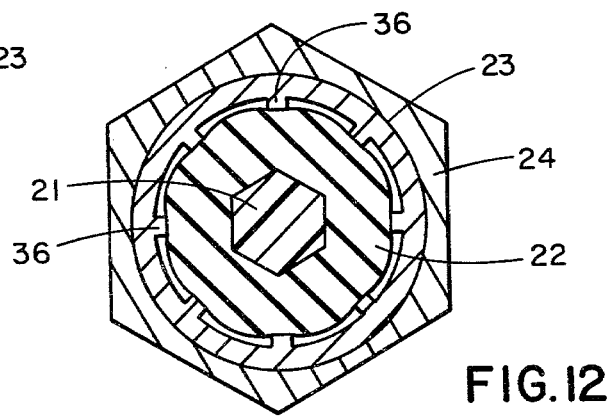
FIG.10　　FIG.11　　FIG.12

RECTANGULAR SEAL BEAM LAMP AND UNIVERSAL SUPPORT ASSEMBLY

BACKGROUND OF THE PRESENT INVENTION

Vitreous glass seal beam lamp units have been used for vehicle lighting since at least as early as the 1930's in the United States. These lamps include a parabolic reflector having a highly mirrorized inner surface that usually has two openings in the base portion that receive connectors for a filament aligned within the reflector. The reflector is enclosed by a circular convex lens also constructed of glass that is located with respect to the reflector by various types of integral locating tabs and is fused to the reflector by heat fusion. The connector assemblies are also connected to the reflector by a heat fusion process, and the content and pressure of gas within the reflector-lens envelope is carefully controlled by a filling tube formed integrally with the rear of the reflector that is fused after the evacuation and/or inert gas filling of the lamp envelope.

Such a seal beam lamp unit is shown and described in the D. K. Right U.S. Pat. No. 2,148,314 dated Feb. 21, 1939.

These seal beam lamp units, which by themselves are replaceable after the filaments burn out, require complicated locking rings and adjustment assemblies permanently carried by the associated vehicle to hold the lamp units in proper position. The locking rings frequently include adjusting brackets for varying the attitude of the lamp unit to properly direct the lamp's beam to effect the desired lamp alignment.

These prior mounting arrangements do not have any provision for shock-mounting the lamp and efforts to devise them to attain shock-absorbing characteristics have been largely unsuccessful without eliminating the beam adjustment function of the mount.

With the advent of rectangular seal beam lamp units, a shock-absorbing mount has been devised for a seal beam lamp that completely shock-mounts the lamp while at the same time permitting limited attitude adjustments of the lamp's beam, such a shock-absorbing mount for a rectangular seal beam lamp is shown in the inventor's co-pending application Ser. No. 148,698 filed May 12, 1980 entitled "Rectangular Headlamp Retainer" assigned to the assignee of the present invention. Even this mount, however, is quite costly and therefore forms a part of the vehicle itself and is not replaceable at lamp burn-out with the seal beam lamp unit itself.

It has been suggested that the reflector of a rectangular seal beam lamp be constructed of a plastic material and that support flanges be formed integrally with the plastic material to eliminate the complicated mounting flanges and rings required in prior lamp units. Such a construction is shown in the Thomas T. Talon et al U.S. Pat. No. 4,188,655. This patent discloses three integral flanges on a plastic reflector that cooperate with three adjusting assemblies mounted to the vehicle that permit adjustment of the lamp beam in two orthogonal phanes. While such an arrangement is suitable for many passenger automobile applications, it remains quite costly because of the three separate adjusting mechanisms required, and it does not provide for, nor can it accommodate any known effective shock-absorbing mechanism.

It is a primary object of the present invention to provide a simplified replaceable seal beam lamp and support unit for utility vehicles that does not have the problems and disadvantages noted above in prior art seal beam lamp units.

SUMMARY OF THE PRESENT INVENTION

In accordance with the present invention, a seal beam lamp and universal support unit is provided that has a plastic reflector with an integral support that forms part of a single universal support for the unit that permits adjustment of the lamp's beam in two orthogonal planes.

The present lamp and support unit is particularly adapted for use in utility and/or off-the-road vehicles where ruggedness and durability are prime considerations. The reflector is an impact resistant plastic molding and a rubber ball extending from the reflector that forms part of a single-point support assembly, provides the unit with high shock-absorbing characteristics. The entire unit, including the lens, reflector and support ball, are replaceable as a unit, eliminating the complicated mounting mechanisms presently associated with seal beam lamp units, while at the same time providing for both beam adjustment and shock mounting.

The construction of the lamp and support unit enables the unit to be manufactured at a sufficiently low cost so that the entire unit may be replaced when the lamp element expires.

Toward these ends, the unit includes a generally rectangular plastic reflector having a highly mirrorized paraboloidal inner surface that reflects light through a rectangular lens constructed of either plastic or vitreous glass material, from a tungsten-halogen bulb mounted within the reflector. The reflector has a polygonal central lower post integrally molded therewith that carries a synthetic rubber ball. The ball has a complementary polygonal bore that non-rotatably receives the reflector post, and has an annular recess that receives a flange on the post to axially locate the post with respect to the ball. A plurality of slots in the ball radiating from the bore define a plurality of flexible fingers that permit the ball to be clamped to the post by a pair of upper and lower threaded clamping members engaging the outer surface of the ball.

The lower one of these clamping members is adapted to be connected directly to the vehicle and has an outer threaded surface and a semi-spherical interior surface defined by a plurality of arcuate radially extending projections therein that receive and engage the ball. The other clamping member is an upper annular member having an internally threaded flange that engages the threads on the lower clamping member and has an inner partly spherical surface that engages the ball and clamps it against the lower clamping member.

BRIEF DESCRIPTION OF THE DRAWINGS

FIG. 4 is a top view of the rubber ball member illustrated in FIG. 3.

FIG. 5 is a cross-section of the ball member taken generally along line 5—5 of FIG. 4.

FIG. 6 is a cross-section of the ball member taken generally along line 6—6 of FIG. 4;

FIG. 7 is a top view of the lower clamping member illustrated in FIG. 3;

FIG. 8 is a cross-section of the lower clamping member taken generally along line 8—8 of FIG. 7;

FIG. 9 is a cross-section of the lower clamping member taken generally along line 9—9 of FIG. 7;

FIG. 10 is a fragmentary section of the lamp and support unit illustrating the universal support portion;

FIG. 11 is a cross-section taken generally along line 11—11 of FIG. 10; and

FIG. 12 is a cross-section taken generally along line 12—12 of FIG. 10.

DETAILED DESCRIPTION OF THE PREFERRED EMBODIMENT

Figure 1:
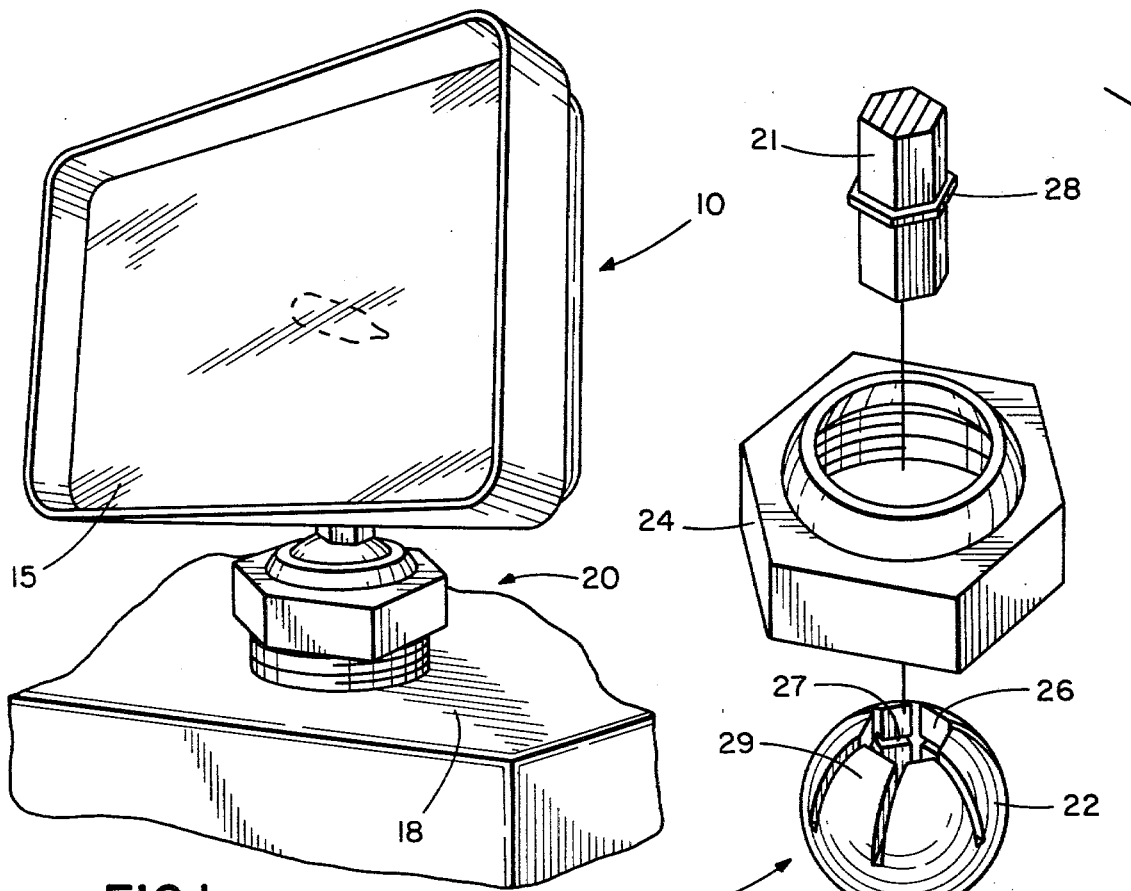
FIG. 1 is a perspective view of the present lamp and support unit on a vehicle.
Figure 2:
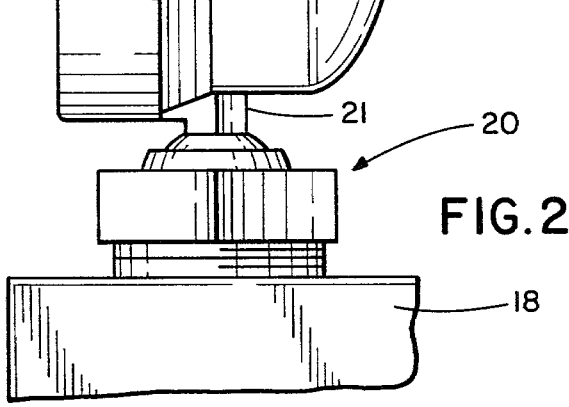
FIG. 2 is a side view of the lamp and support unit illustrated in FIG. 1.

Referring to the drawings and particularly FIGS. 1 and 2, the present rectangular lamp and universal support unit 10 is illustrated and is seen to generally include a rectangular plastic reflector member 11, preferably constructed of an impact resistant plastic, having a highly mirrorized paraboloidal inner surface 12 for reflecting light forwardly from a tungsten-halogen bulb 14. The reflector 11 is closed by a generally rectangular lens 15 that may be constructed of either plastic or a vitreous glass. The reflector 11 is adjustably supported on vehicle panel 18 by a single point universal support 20 that includes polygonal projection 21 extending centrally downwardly from the reflector 11. The universal support 20 permits adjustment of the lamp beam to substantially any position, either vertically or horizontally, without any further adjusting devices, and also provides for a high degree of shock-absorbing.

Figure 3:
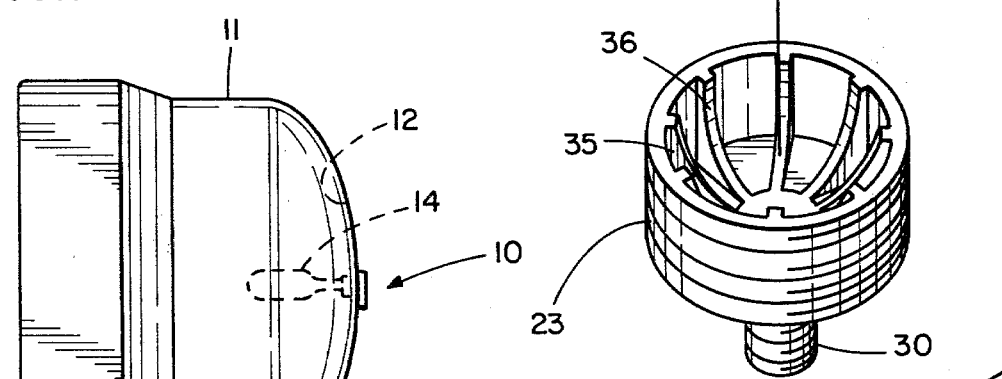
FIG. 3 is an exploded view of the universal mount portion of the lamp and support unit shown in FIGS. 1 and 2.

As seen in FIG. 3, the universal support 20 includes the hexagonal post 21 formed integrally with reflector 11 that carries a synthetic rubber ball 22 clamped to the post by a lower annular clamp member 23 and an upper annular clamp member 24 that are threadedly engaged with each other. The clamp members 23 and 24 not only fix the lamp beam at the proper attitude, but also serve to clamp the shock absorbing rubber ball 22 to the post 21.

As seen in FIG. 4, the rubber shock absorbing ball 22 has a hexagonal closed end bore 26 therein that receives the complementary post 21 on the reflector 11. The bore 26 has a peripheral recess 27 that receives a peripheral flange 28 on the post 21 for the purpose of axially locating and locking the post 21 with respect to the ball 22. A plurality of slots 28a in the ball 22 extend outwardly from the bore 26 and define a plurality of resilient fingers 29 that grasp the outer surface of the post 21.

Fingers 29 flex outwardly to permit the insertion of the post 21 therein and as the flange 28 is slid downwardly within the bore 26 it snaps into the bore recess 27 and fingers 29 then return to their relaxed positions.

As seen in FIGS. 7, 8 and 9, the lower clamping member 23 is annular in configuration and has a threaded downwardly extending post 30 that extends through vehicle panel 18, as seen in FIG. 10, and receives a fastener nut 31 for holding the entire lamp unit 10 to the vehicle panel. The clamp member 23 has a threaded outer surface 33 that threadedly receives threaded flange 34 on the upper clamping member 24. A semi-spherical supporting surface is defined within the lower clamping member 23 by a plurality of radially extending projections 35 integrally molded therein that have arcuate upper surfaces 36 that receive and engage the lower side of the ball member 22, as seen in FIG. 10.

The upper clamping member 24 has a frusto-spherical inner surface 38 that engages and clamps against the upper side of the ball member 22. The outer surface 39 of the upper clamp member 24 is hexagonal in configuration to receive a wrench for tightening the upper clamping member 24 and the lower clamping member 23 against the ball member 22.

It is readily seen that by loosening upper clamp member 24, the ball member 22 and the lamp beam may be positioned in almost any desired attitude both vertically and horizontally. After the lamp is properly positioned, the upper clamping member is threaded downwardly over the lower clamping member, squeezing the flexible fingers 29 of the ball against the post 21, clamping the ball to the post, and positively preventing either rotational or axial movement of the post with respect to the ball. At the same time this clamping action positively locks the lamp 10 in its adjusted angular position.

Since the ball 22 is constructed entirely of a resilient synthetic rubber material, it has an extremely high schock absorbing characteristic and provides adequate support for the lamp unit because the post 21, which is formed integrally with the reflector 11, is of a substantially rigid impact resistant plastic material.

I claim:

1. A seal beam lamp unit for vehicles, comprising; a generally rectangular plastic reflector having a mirrorized paraboloidal inner reflective surface, a halogen bulb mounted within the reflector, a generally rectangular lens mounted to the reflector, said reflector having a rectangular portion surrounding and engaging the lens, a universal shock absorbing support for the lamp unit that provides absorption in all directions including a post formed integrally with the reflector, a compressible spherical ball member having a recess therein receiving the reflector post, and a lamp support assembly surrounding the ball member to selectively compress the spherical ball to position the lamp unit as desired.

2. A seal beam lamp unit for vehicles as defined in claim 1, wherein the lamp support includes a first member that is externally threaded and has a partly spherical recess therein for receiving and engaging the ball member, and a second member that is internally threaded and mating with the first member threads, with a partly spherical recess therein for receiving and engaging the ball member, whereby the first and second members clamp the ball member to the post and hold the lamp unit in a desired position.

3. A seal beam lamp unit for vehicles as defined in claim 1, wherein the post has a polygonal cross-section and a peripheral flange, said ball member recess being a polygonal bore therein, a plurality of radial-extending slots in the ball member radiating from the bore and defining flexible finger portions, said bore having a recess therein receiving the post flange for locating the post in the ball member.

4. A seal beam lamp unit for vehicles, comprising; a generally rectangular plastic reflector having a mirrorized paraboloidal inner reflective surface, a halogen bulb mounted in the reflector, a generally rectangular reflector lens fixed to the reflector, said reflector having a rectangular portion surrounding and engaging the lens, and a universal shock absorbing support for the lamp unit that provides shock absorbtion in all directions including a support projection at least part of which is formed integrally with the reflector, a second projection fixed to said support projection, a resilient spherical ball member fixed to the support and second projections, and a clamp assembly for engaging and holding the ball member in a preselected or adjusted position.

5. A seal beam lamp unit for vehicles as defined in claim 4, wherein the ball member is constructed of rubber.

6. A seal beam lamp unit for vehicles as defined in claim 4, wherein the projection is a post formed integrally with the reflector.

7. A seal beam lamp unit for vehicles as defined in claim 4, wherein the ball member is selectively clamped to the post by the clamp assembly.

8. A seal beam lamp unit for vehicles as defined in claim 5, wherein the clamp assembly includes a lower annular member being externally threaded and having an internal frustospherical recess therein defined by a plurality of radially extending arcuate projections engageable with the ball member, and an upper annular member having internal threads engageable with the external threads on the lower member, and having a frusto-spherical inner surface engageable with the ball member for clamping the ball member against the lower member.

9. A seal beam lamp unit for vehicles as defined in claim 4, wherein the projection is a polygonal post formed integrally with the reflector, said post having a peripheral flange, said ball member having a polygonal bore therein with slots radiating from the bore to define a plurality of flexible finger portions, and a generally annular recess in the ball member bore that receives the peripheral flange on the post to axially locate the post in the ball member bore.

10. A seal beam lamp unit for vehicles, comprising; a reflector constructed of plastic and having a generally paraboloidal inner reflective surface, a halogen bulb mounted in the reflector, a generally rectangular lens mounted to the reflector, a shock absorbing universal support for the lamp that provides shock absorption in all directions including a polygonal post formed integrally with the base of the reflector, said post having a flange formed on its periphery, said support including a resilient rubber ball member having a polygonal bore therein for receiving the reflector post, a recess in the bore for receiving the post flange, said ball member having a plurality of slots therein radiating from the bore, a lower externally threaded clamp member having a partly spherical inner surface for receiving and engaging the ball member, and an upper internally threaded clamp member, threadedly engaging the lower clamp member, having a partly spherical surface for receiving and engaging the ball member so that as the upper clamp member is threaded to the lower clamp member the ball member will be compressed clamping it to the post on the reflector and at the same time holding the lamp unit in a preselected position.

11. A vehicular seal beam lamp unit, comprising; a one-piece reflector having an integral rectangular forwardly extending rim and an integral rear paraboloidal portion, said paraboloidal portion having a mirrorized inner reflective surface, a halogen bulb mounted within the reflector, a rectangular lens mounted within the forwardly projecting rim of the reflector, a universal shock-absorbing support assembly for the lamp unit that has shock-absorbing characteristics in two orthogonal planes extending therethrough including a post portion formed integrally with the plastic reflector, a spherical compressible ball member mounted on the integral reflector post, and a clamp assembly for engaging and holding the ball member and the lamp unit in any preselected position.

* * * * *